United States Patent Office 2,945,637
Patented July 19, 1960

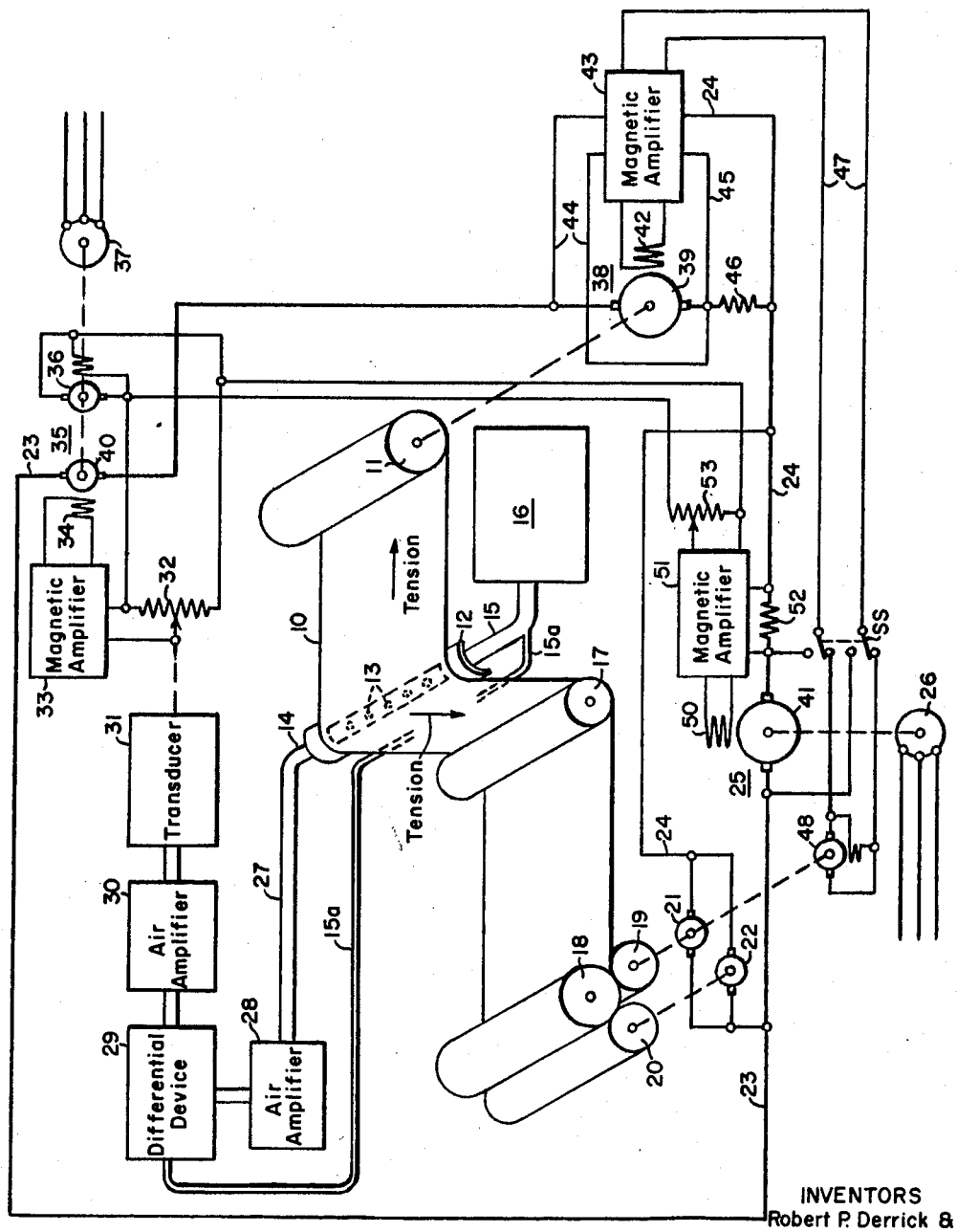

2,945,637

PAPER MILL WINDER DRIVES

Robert P. Derrick, Wilkinsburg, and Sylvester J. Campbell, Penn Township, Allegheny County, Pa., assignors to Westinghouse Electric Corporation, East Pittsburgh, Pa., a corporation of Pennsylvania Filed July 19, 1957, Ser. No. 672,936

7 Claims. (Cl. 242—75.51)

Our invention relates to tension regulators for sheet winder drives, and relates more particularly to tension regulators for paper mill winder drives.

On paper mill winder drives, a braking effort of one form or another is generally employed to insure proper sheet tension. The most commonly employed methods of braking are a mechanical friction brake in which the tension is pneumatically regulated, and an electric regenerative braking generator in which tension regulation is a function of armature current. The mechanical friction brake has the disadvantages of excessive wear and brake shoe "chattering" at low tensions resulting in erratic tension and high maintenance cost. Tension regulation by the presently used braking generator is unsatisfactory, especially at slight tensions, since the tension control signal is a function of armature current rather than tension measured directly, and the armature current is composed of windage and friction loss current in addition to the current proportional to tension.

Our invention uses the pneumatic tension sensing equipment formerly used to control mechanical friction braking, to provide air signals proportional to sheet tension. These air signals operate on an air-current transducer to control a magnetic amplifier connected to the field winding of a booster generator which is connected in series with the main generator which energizes the motors of the wind drums, and a braking generator. This regulator takes its tension signals directly from the sheet tension, thus accurate tension regulation, stall tension, and inertia compensation are inherent.

A second magnetic amplifier of the common counter-E.M.F. type is connected to the field winding of the braking generator. This regulator provides IR compensation and keeps the booster and its magnetic amplifier in range, permitting the use of a smaller booster generator than otherwise would be required. This second magnetic amplifier takes control signals from the armature current and voltage of the braking generator, and paper speed, to provide a constant counter-E.M.F. for a required paper tension.

An object of this invention is to use a pneumatic tension sensing signal to control the drag of a braking generator which regulates the tension in a moving sheet.

Another object of this invention is to regulate the tension of a moving sheet with a braking generator, and to control a booster generator connected to the braking generator with tension signals taken directly from the sheet.

Another object of this invention is to coordinate an electric regenerative braking system with a pneumatic tension sensing system for controlling the tension in a moving sheet.

Our invention will now be described with reference to the annexed drawing which is a diagrammatic view, including an electrical circuit schematic, of one embodiment of this invention.

A paper sheet 10 is unwound from a supply roll 11 and passes over a curved guide 12 which has a plurality of spaced-apart orifices 13 extending therethrough and over which the sheet 10 passes. The orifices 13 are lined-up with corresponding orifices in an air manifold 14 which is connected through a pipe 15 to a source 16 of compressed air.

The guide 12 turns the sheet 10 through an angle the sheet then passing under a direction changing roll 17 and around a shipping roll 18 and wind drums 19 and 20. The drums 19 and 20 are connected to drive motors 21 and 22 respectively, which are connected by wires 23 and 24 across a main D.C. generator 25, which is driven by an A.C. motor 26.

The manifold 14 is also connected through a pipe 27 and an air amplifier 28 to an input of a differential device 29 which also is connected to the air supply 16, by the pipe 15a.

The components described so far in connection with the drawing are conventional. A differential device similar to the device 29 has previously been used to supply air into a cylinder containing a piston which adjusted brakes on a drum of a parent roll for controlling tension.

Our invention connects the output of the differential device 29 through an air amplifier 30 to a conventional air-current transducer 31 which contains a spiral, or Bourdon, tube, a pressure responsive resistor, or a bellows, or any other means for changing the value of resistance of resistor 32 and which adjusts a variable resistor 32 which may be a carbon-pile. The resistor 32 is connected across an exciter generator 36 and to the input of a magnetic amplifier 33, the output of which is connected across field winding 34 of booster generator 35. An A.C. motor 37 drives the armatures of the booster 35 and excitor 36 generators.

The shaft of the parent or supply roll 11 is connected to the shaft of a regenerative braking generator 38, the armature 39 of which is connected in series with the armature 40 of the booster generator 35 and the armature 41 of the main generator 25.

The braking generator has a field winding 42 which is connected to the output of a conventional, constant counter-E.M.F., magnetic amplifier 43 which has voltage input windings (not shown) connected by wires 44 across the armature 39 of the braking generator 38; has IR windings (not shown) connected by wires 24 and 45 across a resistor 46 in series with the armature 39, and has speed windings (not shown) connected by wires 47 across pilot generator armature 48. The shaft of the armature 48 is connected to the shaft of the wind drum motor 21 so as to be driven thereby.

The magnetic amplifier 43 is conventional, and may be of the type disclosed in U.S. Patent No. 2,748,329 assigned to Westinghouse Electric Corporation.

In some cases it may not be necessary to derive a speed voltage from a pilot generator driven by a wind drum, since a satisfactory speed signal in such cases can be obtained from across the main generator armature 41. This may be accomplished by moving the selector switch SS to its upper position.

The main generator has its field winding 50 connected to the output of a conventional magnetic amplifier 51 which has one input connected across a resistor 52 in series with the armature 41, and which has another input connected to speed-set potentiometer 53 which is connected across the exciter generator 36.

*Operation*

In operation, the wind drums 19 and 20 pull the sheet from the parent roll 11 across the orifices 13 in the guide 12. Changes in the tension in the sheet change the volume of air escaping through the orifices 13, causing air pressure changes in the air manifold 14 and the pipe 27. The air fed back through the pipe 27 is amplified in the amplifier 28 and supplied into differential device 29 which supplies air pressures through the amplifier 30 into the air transducer 31 which are proportional to the pressure changes in the manifold 14 which are proportional to changes in the sheet tension.

The transducer 31 varies the value of the resistor 32 in proportion to changes in the tension in the sheet, and causes the amplifier 33 to vary the current flowing through the field winding 34 of the booster generator in accordance with changes in sheet tension. The output voltage of the booster generator 35 is thereby varied in accordance with variations in sheet tension.

The braking generator 38 is driven by the parent roll 11 when the mill is running, and the main, booster and braking generators provide a direct current which is circulating through their series circuit in the same direction.

As the parent roll decreases in diameter, or during sheet acceleration for any other reason, the sheet tension will increase, causing a reduced pressure loss in the manifold 14, and causing through the resulting change in the resistor 32 by the transducer 31, the voltage from the booster generator 35 increases and causes the braking generator to speed up, thereby increasing the speed of the parent roll and reducing sheet tension.

During sheet deceleration, the sheet tension decreases, causing a greater air pressure drop in the manifold 14, and causing the voltage from the booster generator to decrease, and the braking generator to slow down and to increase the sheet tension.

The speeding up and slowing down of the braking generator as described in the foregoing, takes place so rapidly that the sheet tension is maintained substantially constant.

It is desired that the voltage from the braking generator remain substantially constant during its changes in speed so that the voltage from the booster generator can be more effective. To accomplish this, the magnetic amplifier 43 controls the field of the braking generator as determined by differential between its speed windings and its voltage and IR windings, to maintain a substantially constant braking generator voltage for a required sheet tension.

Advantages of our invention are that accurate tension control at all production tensions and paper speeds is provided; that inertia compensation is inherent since the tension control signal is taken directly from the sheet; sheet "pay-out," slack "takeup," and "stall tension" features are available; a higher ratio of core size/roll diameter is possible since the speed change is not wholly dependent upon field weakening, and in that the use of electrical regenerative braking instead of mechanical braking eliminates mechanical brake wear and noise, and reduces the power required and the size of the main generator.

We claim as our invention:

1. In a tension control system for a sheet drive having a parent roll, a wind drum, a motor for driving said drum and a main generator for energizing said motor, the combination of a braking generator connected to said roll so as to be driven thereby, a booster generator connected in series with said main and braking generators, sheet tension sensing means for contacting a sheet in its movement between said roll and drum, and voltage control means using tension signals from said sheet tension sensing means for increasing the voltage from said booster generator when an increase in sheet tension occurs and for reducing the voltage from said booster generator when a decrease in sheet tension occurs.

2. A tension control system for a sheet drive having a parent roll, a wind drum for receiving a sheet from said roll, a motor for driving said drum, and a main generator for energizing said motor, the combination of a braking generator connected to said roll so as to be driven thereby, a booster generator connected in series with said main and braking generators, pneumatic sheet tension sensing means for contacting a sheet between said roll and drum, and voltage control means including an air current transducer connected to said sheet tension sensing means for increasing the voltage from said booster generator when an increase in sheet tension occurs and for decreasing the voltage from said booster generator when a decrease in sheet tension occurs.

3. In a tension control system for a sheet drive having a parent roll, a wind drum, a motor for driving said drum and a main generator for energizing said motor, the combination of a braking generator connected to said roll so as to be driven thereby, a booster generator connected in series with said main and braking generators, sheet tension sensing means for contacting a sheet in its movement between said roll and drum, and voltage control means using tension signals from said sheet tension sensing means for increasing the voltage from said booster generator when an increase in sheet tension occurs and for reducing the voltage from said booster generator when a decrease in sheet tension occurs, with said braking generator having a field winding, and having a magnetic amplifier provided with its output connected to said field winding, and said amplifier having inputs, and first voltage supply means provided to supply voltage from across said braking generator to an input of said amplifier, second voltage supply means provided to supply voltage proportional to the current flowing through the armature of said braking generator to an input of said amplifier, and third voltage supply means provided to supply voltage proportional to the speed for said drum to one of said inputs.

4. In a tension control system for a sheet drive having a parent roll, a wind drum, a motor for driving said drum and a main generator for energizing said motor, the combination of a braking generator connected to said roll so as to be driven thereby, a booster generator connected in series with said main and braking generators, sheet tension sensing means for contacting a sheet in its movement between said roll and drum, and voltage control means using tension signals from said sheet tension sensing means for increasing the voltage from said booster generator when an increase in sheet tension occurs and for reducing the voltage from said booster generator when a decrease in sheet tension occurs, with said braking generator having a field winding, and having a magnetic amplifier provided with its output connected to said field winding, and said amplifier having inputs, and first voltage supply means provided to supply voltage from across said braking generator to an input of said amplifier, second voltage supply means provided to supply voltage proportional to the current flowing through the armature of said braking generator, to an input of said amplifier, and third voltage supply means provided to supply voltage proportional to the speed of said drum to one of said inputs, said booster generator having a field winding, and said voltage control means using tension signals including current adjusting means for adjusting the current flowing through said booster generator field winding.

5. A tension control system for a sheet drive having a parent roll, a wind drum for receiving a sheet from said roll, a motor for driving said drum, and a main generator for energizing said motor, the combination of a braking generator connected to said roll so as to be driven thereby, a booster generator connected in series with said main and braking generators, pneumatic sheet tension sensing means for contacting a sheet between said roll and drum, and voltage control means including an air current transducer connected to said sheet tension sensing means for increasing the voltage from said booster generator when an increase in sheet tension occurs and for decreasing the voltage from said booster generator when a decrease in sheet tension occurs, said braking generator having a field winding, and a magnetic amplifier having its output connected to said field winding being provided, and said amplifier having inputs, and first voltage supply means provided to supply voltage from across said braking generator to an input of said amplifier, second voltage supply means provided to supply voltage proportional to the current flowing through the armature of said braking generator to an input of said amplifier, and third voltage supply means provided to supply a voltage proportional to the speed of said drum to one of said inputs.

6. A tension control system for a sheet drive having a parent roll, a wind drum for receiving a sheet from said roll, a motor for driving said drum, and a main generator for energizing said motor, the combination of a braking generator connected to said roll so as to be driven thereby, a booster generator connected in series with said main and braking generators, pneumatic sheet tension sensing means for contacting a sheet between said roll and drum, and voltage control means including an air current transducer connected to said sheet tension sensing means for increasing the voltage from said booster generator when an increase in sheet tension occurs and for decreasing the voltage from said booster generator when a decrease in sheet tension occurs, said braking generator having a field winding, and a magnetic amplifier having its output connected to said field winding being provided, and said amplifier having inputs, and first voltage supply means provided to supply voltage from across said braking generator to an input of said amplifier, second voltage supply means provided to supply voltage proportional to the current flowing through the armature of said braking generator to an input of said amplifier, and third voltage supply means provided to supply a voltage proportional to the speed of said drum to one of said inputs, said booster generator having a field winding, a second magnetic amplifier being provided with its output connected to said booster generator field winding, and a voltage source being connected to the input of said second amplifier, and voltage variation means provided for actuation by said transducer to vary the voltage from said source supplied to said input of said second amplifier.

7. A tension control system for a sheet drive having a parent roll, a wind drum for receiving a sheet from said roll, a motor for driving said drum, and a main generator for energizing said motor, the combination of a braking generator connected to said roll so as to be driven thereby, a booster generator connected in series with said main and braking generators, pneumatic sheet tension sensing means for contacting a sheet between said roll and drum, and voltage control means including an air current transducer connected to said sheet tension sensing means for increasing the voltage from said booster generator when an increase in sheet tension occurs and for decreasing the voltage from said booster generator when a decrease in sheet tension occurs, said booster generator having a field winding, a magnetic amplifier having its output connected to said field winding being provided, a voltage source being provided and connected to the input of said amplifier, and voltage variation means provided for actuation by said transducer to vary the voltage supplied by said source to said amplifier input.

References Cited in the file of this patent

UNITED STATES PATENTS

| | | |
|---|---|---|
| 2,451,901 | Auburn | Oct. 19, 1948 |
| 2,519,218 | Bacheler et al. | Aug. 15, 1950 |
| 2,722,639 | Shaad et al. | Nov. 1, 1955 |